United States Patent [19]
Peng

[11] Patent Number: 5,526,167
[45] Date of Patent: Jun. 11, 1996

[54] SCANNING DEVICE

[75] Inventor: Ke-Ou Peng, Delft, Netherlands

[73] Assignee: Opticon Sensors Europe B.V., Hoofddorp, Netherlands

[21] Appl. No.: 258,472

[22] Filed: Jun. 7, 1994

[30] Foreign Application Priority Data

Jul. 6, 1993 [EP] European Pat. Off. ............. 93201989

[51] Int. Cl.$^6$ ............................. G02B 26/08; G02B 5/32; G02B 26/10; G06K 7/10
[52] U.S. Cl. ................. 359/209; 359/211; 359/17; 235/467
[58] Field of Search ............................. 359/17, 211, 209; 235/467; 219/121.67

[56] References Cited

U.S. PATENT DOCUMENTS

| 4,118,109 | 10/1978 | Crawford et al. | 359/211 |
|---|---|---|---|
| 4,348,108 | 9/1982 | Shindow | 359/211 |
| 4,822,974 | 4/1989 | Leighton | 219/121.67 |
| 5,018,803 | 5/1991 | Hecker et al. | 359/211 |
| 5,274,489 | 12/1993 | Smith et al. | 359/211 |

FOREIGN PATENT DOCUMENTS

| 0032794 | 7/1981 | European Pat. Off. . |
|---|---|---|
| 0492730 | 7/1992 | European Pat. Off. . |
| WO91/11290 | 8/1991 | WIPO . |

OTHER PUBLICATIONS

"Thermal Imaging Systems", by J. M. Lloyd, 1979, New York, pp. 316–320.

*Primary Examiner*—Paul M. Dzierzynski
*Assistant Examiner*—Audrey Y. Chang
*Attorney, Agent, or Firm*—Young & Thompson

[57] ABSTRACT

Scanning device for optically scanning symbol codes, such as bar codes, comprising a laser source for producing a scanning beam, a detector for detecting light backscattered by the scanned symbol codes, first and second rotatable deflection elements for both transmitting and deflecting the scanning beam so as to generate a scanning pattern, and drive devices for rotating the first and second deflection elements around a first and second axis of rotation, respectively, in which scanning device the scanning beam when impinging upon the first deflection element does not coincide with at least one of both axes of rotation.

11 Claims, 5 Drawing Sheets

SCANNING DEVICE

BACKGROUND OF THE INVENTION

The present invention relates to a scanning device for optically scanning symbol codes, such as bar codes, comprising a laser source for producing a scanning beam, a first lens for focusing the scanning beam, a detector for detecting light backscattered by the scanned symbol codes, first and second rotatable deflection means for both transmitting and deflecting the scanning beam so as to generate a scanning pattern, and drive means for rotating the first and second deflection means around a first and second axis of rotation, respectively.

In many scanning devices, e.g. in bar code readers, multiple directional scanning is used. Because of a large longitudinal working range, laser scanners are widely used for bar code reading. To read bar codes, at least one scanning line needs to be generated to scan the bar code. However, in practice bar codes on products are situated at an arbitrary orientation. To still be able to read bar codes by using a bar code reader oriented itself in an arbitrary direction, bar code readers generating multiple-directional scanning patterns are required.

Moreover, different kinds of objects often require a different kind of scanning pattern.

In the publication "Thermal imaging systems" by J. M. Lloyd, Plenum Press, New York, 1979, pages 316–320, the general principles of the use of rotating wedges for generating scanning patterns is disclosed. However, this document only discloses passive scanning means, i.e. no additional scanning beam is generated, e.g. by a laser source, to scan an object. In this passive scanning means known per se, a light beam reflected by an object impinges upon a first one of the two rotating wedges. Before incidence, the light beam propagates along a path that makes an angle with respect to the axis of rotation of both wedges. After deflection by both wedges, the light beam propagates substantially parallel to the axis of rotation of the wedges to detection means.

EP-A-0,492,730 describes how the general principles of using two rotating wedges may be employed in active scanning devices such as bar code scanners, and what technical measures may realize a bar code scanner embodying these principles.

Both in theoretical considerations as formulated, for instance, in the publication of Lloyd mentioned above and in the practical design shown in said EP-A-0.492.730 two rotating wedges are used, the axes of rotation of both of the wedges coincide, as this was considered to be necessary to generate well defined scanning patterns. Moreover, in the arrangement shown in EP-A-0.492.730 the scanning beam impinging upon the deflection means substantially coincides with the coinciding axes of rotation of the wedges. In such an arrangement the driving shafts of the wedges will have to be hollow to allow the scanning beam to pass along the axes of rotation. Furthermore, a motor having two crown wheels of different diameters and two pinions meshing with the respective crown wheels is shown in EP-A-0,492,730. However, such an arrangement has to meet high tolerance requirements, and is not cheap to manufacture, because no standard elements are used.

WO-A-91/11290 discloses an imaging device suitable for mounting on the arm of a welding robot, close to a welding torch, in order to obtain 3-D topological data from a target surface. In the apparatus according to this international patent application a rotatable wedge prism is used which is rotatable around an axis of rotation. In use, a laser beam impinges upon the rotating wedge prism which laser beam does not coincide with the axis of rotation. Only one rotating wedge prism is used in order to generate a circular scanning pattern on an object the distance of which to the measuring device is to be established. This international patent application does not disclose or suggest that the concept of a laser beam not coinciding with one rotating wedge prism has any advantage in a scanning device in which at least two rotatable deflection means are used to generate complicated scanning patterns to scan symbol codes. The field of application of the imaging device of WO-A-91/11290 differs from the field of scanning symbol codes.

SUMMARY OF THE INVENTION

Therefore, it is an object of the present invention to provide a relatively simple scanning device that, while using rotating deflection means, can generate various multiple-directional scanning patterns.

To meet this object the scanning device as defined above is characterized in that the scanning beam when impinging upon the first deflection means does not coincide with at least one of both axes of rotation.

By the application of these measures the generated scanning pattern will loose its rotational symmetry. However, it appears that the exact rotational symmetry is not important for most applications, such as bar code readers. Moreover, surprisingly, if the shift of the scanning beam from either of both axes of rotation is small the resulting non-symmetry will also be very small. The introduction of this non-symmetry offers great advantages in the actual design, because no complicated driving mechanism with two hollow shafts, one for every rotating deflection means each, e.g. wedges, is needed anymore. Now, it is possible to use standard driving means for the rotating deflection means.

The deflection means may be triangular prisms.

In the scanning device according to the invention the scanning beam may impinge upon one of the first or second deflection means substantially along the first or second axis of rotation, respectively.

The driving means may comprise a first motor and a second motor, the first motor driving said first deflection means and the second motor driving said second deflection means, both said motors being connected to a synchronising/control unit, which controls the speed of rotation and the direction of rotation of both motors in order to generate a required scanning pattern. These measures offer advantageous and flexible design possibilities for a scanning device according to the invention. First of all, by controlling the speed of rotation and the direction of rotation relative to each other of the two deflection means the scanning pattern may be given a predetermined shape, depending on the actual application. Secondly, the first and second motor may be located within a housing of the scanning device without any mechanical limitation as to mutually connected driving means.

The prisms may have a prism angle of less than 15°.

Preferably, the scanning device comprises a reflective element for directing the light focused by the first lens at the deflection means.

The scanning device according to the invention may comprise a second lens for focusing the backscattered light onto the detector, wherein the second lens is provided with an aperture for transmitting the scanning beam focused by the first lens.

Moreover, the scanning device may be provided with a third lens for determining the size of the scanning pattern.

BRIEF DESCRIPTION OF THE DRAWINGS

Below, the invention will be explained in greater detail with reference to the drawings.

DETAILED DESCRIPTION OF THE EMBODIMENTS

Figure 1A:
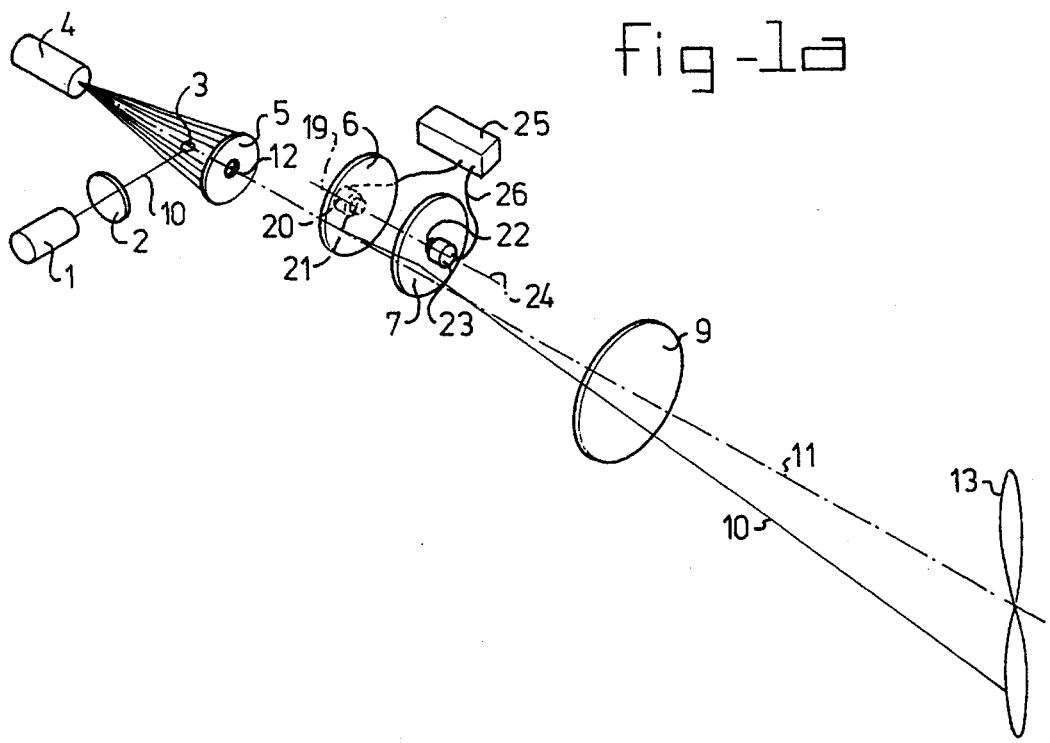
FIG. 1a shows a diagrammatic perspective view of the most prominent parts of the preferred embodiment of the device according to the invention.

FIG. 1a shows the most important parts of the device according to a first embodiment of the invention in perspective. The device comprises a laser 1, a focusing lens 2, a mirror 3, a detector 4, a detection lens 5, a first prism 6, a second prism 7, driving means 20, 23 and an adjustment lens 9. The laser 1, which is preferably a diode laser, produces light which is concentrated by the focusing lens 2. The light beam 10 thus formed is deflected onto an incident propagation path 11 by the mirror 3. The light beam 10 then enters the detection lens 5 through an aperture 12 provided for the purpose. The first prism 6 deflects the light beam 10 at a first angle from its incident propagation path 11. The second rotating prism 7 causes a further deflection of the light beam 10 through a second angle that might be equal to the first angle. The light beam 10 thus deflected by the two prisms then might pass through the adjustment lens 9 so as to form a scanning pattern 13 on a scanning surface (not shown). The scanning surface might comprise a bar code to be detected. The adjustment lens 9 can be used to adjust the size of the scanning pattern 13 to the symbol or bar code. When the scanning pattern is varied by the adjustment lens 9 the linear scanning speed will be increased.

Then, the light scattered back by the scanning surface passes through the adjustment lens 9, the second prism 7 and the first prism 6, and then reaches the detection lens 5. The back-scattered light is focused on the detector 4 by the detection lens 5.

The first prism 6 is connected to a motor 20 via a driving shaft 21. During operation, the motor 20 rotates the first prism 6 around an axis of rotation 19. The second prism 7 is connected to a second motor 23 via a driving shaft 22. During operation the motor 23 rotates the second prism 7 around an axis of rotation 24. In the embodiment of FIG. 1a, the axes of rotation 19, 24 of the prisms 6 and 7, respectively, coincide with each other but do not coincide with the incident propagation path 11 of the scanning beam 10. Therefore, the scanning beam 10 does not impinge upon the first prism 6 along the axis of rotation 19 of the first prism 6 and the shaft 21 does not need to be hollow to let the scanning beam 10 pass. In the arrangement according to FIG. 1a, the scanning beam 10 deflected by the first prism 6 impinges upon the second prism 7 on a point neither located on the incident propagation path 11 nor on the axis of rotation 24 of the second prism 7. Consequently, the driving shaft 22 of the prism 7 also need not be hollow. Although a slightly non-symmetrical deflection might occur in the arrangement shown in FIG. 1a, still a useful scanning pattern 13 might be generated.

If the two motors 20 and 23 are synchronised by a synchronising/control unit 25 the generated scanning pattern 13 may have a recurring character. The synchronising/control unit 25 may be designed in any suitable way known to a person skilled in the art and, as such, is no part of the present invention. The synchronising/control unit might synchronise and control the motors 20, 23 in an electrical way via cables 26. However, also a mechanical way of synchronising is possible. The best way to mechanically synchronise the rotation of both prisms 6, 7 is to use only one motor driving both driving shafts 21, 22 during operation. However, using two different motors 20, 23 might result in more flexibility as to the locations of both prisms 6, 7 within a housing (not shown) of the scanning device.

Figure 1B:
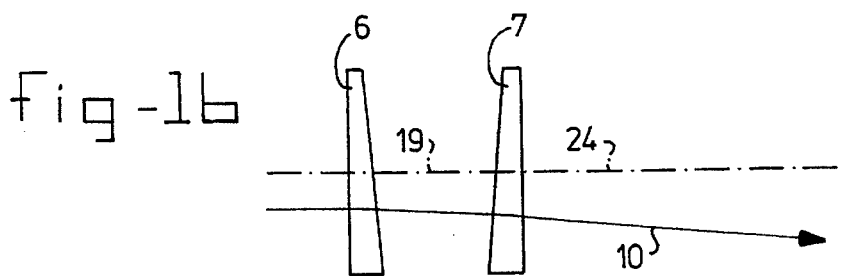
FIGS. 1b, 1c, 1d show schematic side views of two cooperating deflection means deflecting a scanning beam.
Figure 1C:
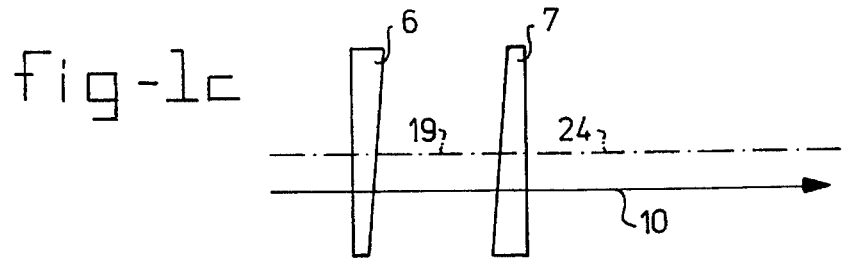
Figure 1D:
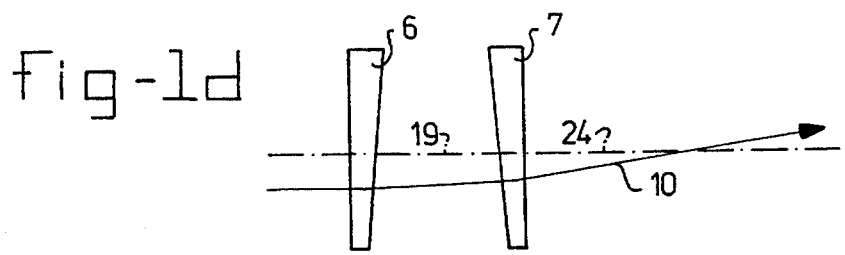

FIGS. 1b, 1c, 1d show, very schematically, possible orientations of the prisms 6, 7 with respect to each other in time during operation. In FIG. 1b the situation is shown that the scanning beam 10 first passes a thicker part of the prism 6 and, after being deflected, passes a thicker part of prism 7. When the prisms 6, 7 rotate out of phase such that the scanning beam 10 passes a thinner part of one of the prisms, say 6, and a thicker part of the other prism, say 7, then the total deflection will be substantially 0°. This situation is depicted in FIG. 1c. FIG. 1d shows a situation in which the scanning beam 10 passes a thinner part of prism 6 and a thinner part of prism 7. In the situations shown in FIG. 1b, 1c, 1d the total deflection by the combined prisms 6, 7 is different. So, during operation, a scanning pattern 13 is generated. Preferably, the motors 20, 23 are synchronised in such a way that a repeatable scanning pattern 13 is generated. Whether the pattern is repeatable depends on the relative rotation speeds. Sometimes, for instance, when the speed ratio equals $\pi$, the pattern 13 is not repeatable. However, such a situation might still be useful, for then, more scanning directions are available.

Figure 2:
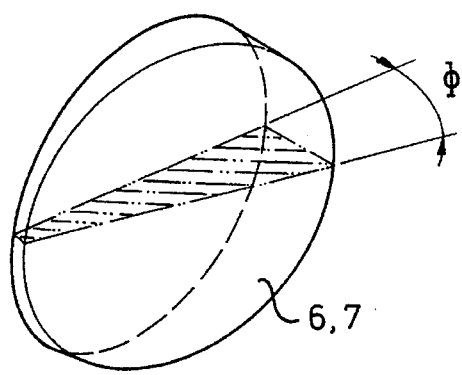
FIG. 2 shows a cut-away view of a prism to be used as a possible deflection means.

FIG. 2 shows a cut-away view of the prism 6, 7 used in the embodiment of FIG. 1a, in which the prism angle $\phi$ is indicated. The prism angle can have a wide variety of values. According to the invention, a scanning device which has a compact structure and which generates the desired scanning patterns 13 can preferably be produced by using prisms whose prism angle is less than 15°. Suitable values are, for example, 6°, 8° and 10°. As a result of this small angle, the prisms can be relatively thin and their weight is consequently low. This is especially important for scanning devices which are held in the hand when in use. Further advantages of the use of said prisms is their flexibility in forming a high-density scanning pattern with a limited directional angle and the limited aberration.

Figure 3A:
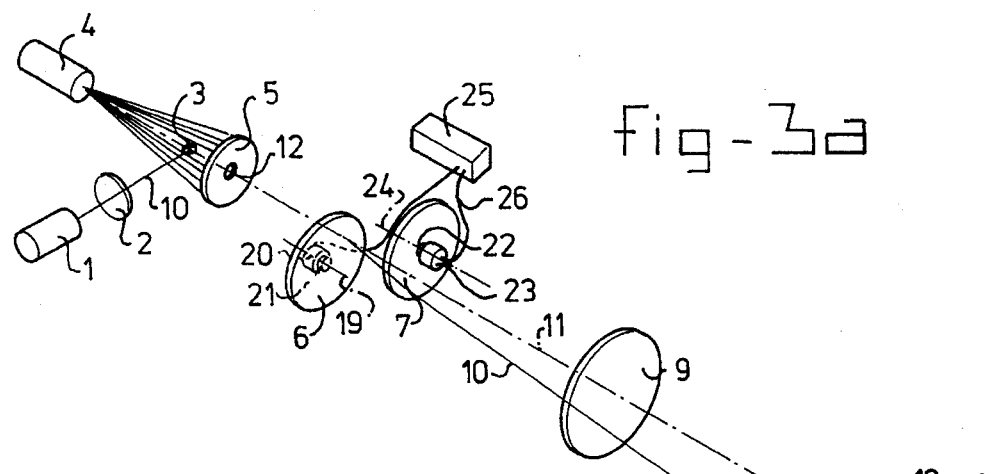
FIG. 3a shows another preferred embodiment of a scanning device using two deflection means.

FIG. 3a shows a second embodiment of the present scanning device. The same reference numbers denote the same elements as in FIG. 1a and the description of the same elements as in FIG. 1a will not be repeated.

The difference between the embodiments shown in FIG. 1a and 3a, respectively, is that in the embodiment of FIG. 3a the axis of rotation 19 of the first prism 6 and the axis of rotation 24 of the second prism 7 do not coincide. Moreover, the incident propagation path 11 of the scanning beam 10 neither coincide with axis 19 nor with axis 24.

Figure 3B:
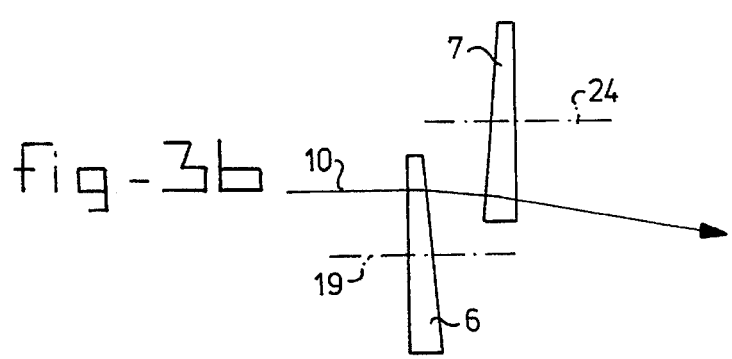
FIG. 3b, 3c, 3d show schematic side views of two cooperating deflection means in the arrangement according to FIG. 3a and deflecting a scanning beam.
Figure 3C:
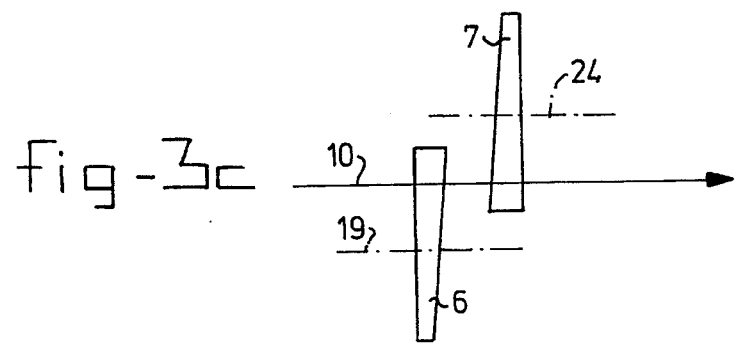
Figure 3D:
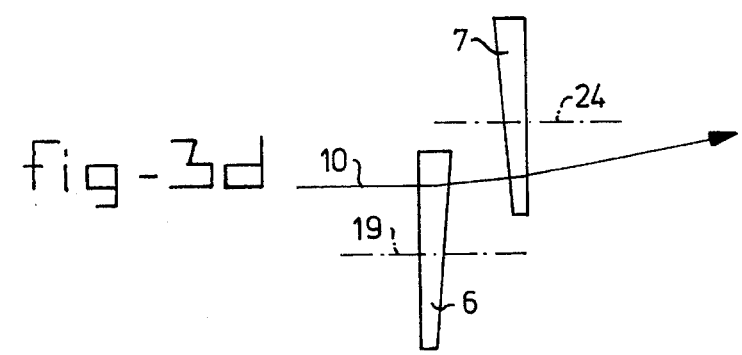

FIGS. 3b, 3c, 3d show various situations of deflecting the incident beam 10 during operation of the device, i.e. when both prisms 6, 7 are rotated by their respective driving means 20, 23 controlled by the synchronising/control unit 25. The situations shown are similar to the situations shown in FIGS. 1b, 1b, and 1c, respectively, and need no further comment.

Figure 4A:
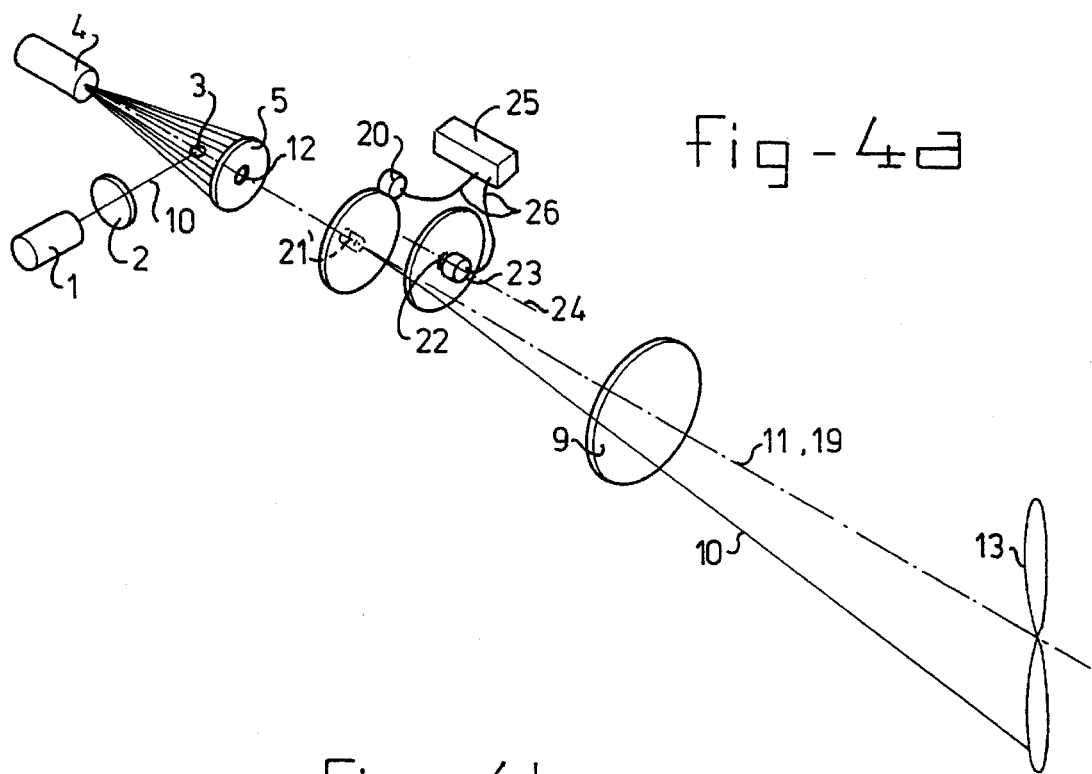
FIG. 4a shows a third embodiment of the scanning device according to the invention.

A third embodiment of the present invention is shown in FIG. 4a. In the arrangement shown in FIG. 4a, the axis of rotation 19 of the first prism 6 does coincide with the incident propagation path 11. Therefore, a hollow driving shaft 21' of the first prism 6 is preferred. The hollow driving shaft 21' is driven by suitable driving means 27, e.g. a driving plate connected to a driving shaft of the motor 20. Also in the arrangement according to FIG. 4a, one motor instead of two motors 20, 23 might be used.

Figure 4B:
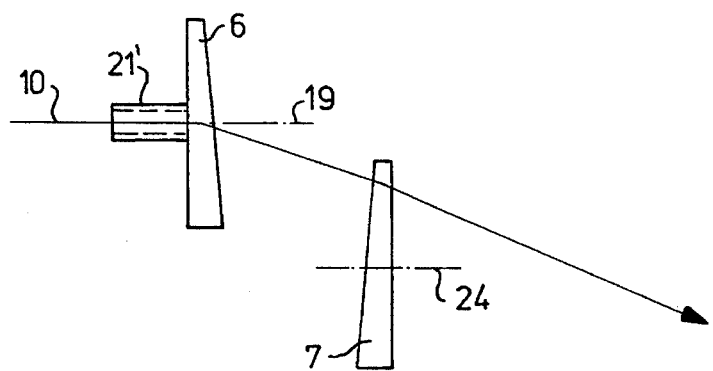
FIG. 4b shows a schematic side view of two cooperating deflection means in the arrangement according to FIG. 4a and deflecting a scanning beam.

FIG. 4b shows a very schematic side view of the prisms 6, 7 and the path followed by the scanning beam 10 after deflection by the prisms 6, 7.

Although in FIG. 4a the situation is shown in which the axis of rotation 19 of the first prism 6 coincides with the incident propagation path 11, it is also possible to design the scanning device in such a way that the axis of rotation 24 of the second prism 7 coincides with the incident propagation path 11, whereas then the axis of rotation 19 of the first prism 6 does not. However, the situation as shown in FIG. 4a is preferred, because the transverse shift of the scanning beam 10, resulting from prism 6 is smaller than from prism 7 and, therefore, the hollow shaft may be smaller when used for prism 6, thus keeping motor costs lower.

Although in the arrangement according to FIG. 4a the first prism 6 has a hollow driving shaft 21', the arrangement still offers great flexibility in design.

Figure 5A:
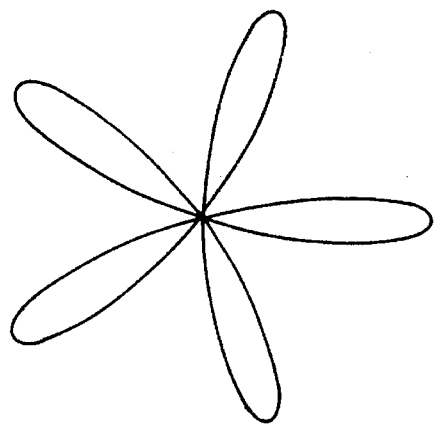
FIGS. 5a to 5d show possible scanning patterns generated by the devices shown in FIGS. 1, 3, or 4.
Figure 5B:
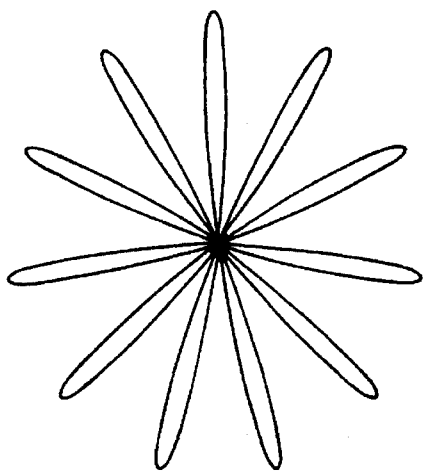
Figure 5C:
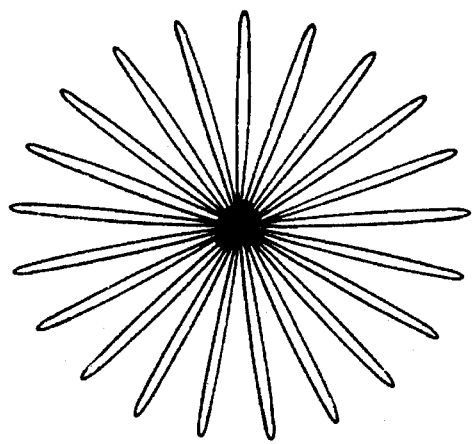
Figure 5D:
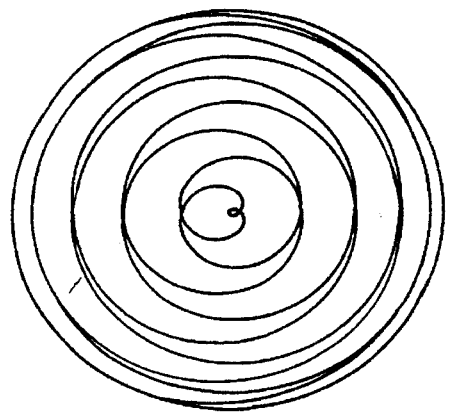

As mentioned before, the actual shape of the scanning pattern 13 is controlled by the synchronising/control unit 25. The scanning amplitude is determined by the prism angle and the refraction index of the prism material used, and also by the adjustment lens 9 when this lens 9 is used. With two different motors 20, 23, e.g. dc motors or step-motors, the scanning pattern can be varied in accordance with practical requirements. FIGS. 5a to 5d show some examples of scanning patterns. In FIG. 5a the speed ratio of the two motors 20, 23 is −1:1,5, in FIG. 5b −1:1,2, in FIG. 5c −1:1,1, and in FIG. 5d +1:1,1 ("−" means rotations in opposite directions, whereas "+" means rotations in the same direction). The scanning pattern shown in FIG. 5d may be used to scan circular (bar) codes of various diameters.

In the embodiments shown in FIGS. 1a, 3a, 4a both deflection means 6, 7 are constituted by prisms as depicted in FIG. 2. However, the scanning device might as well function by replacing one of the prisms 6 or 7 by a rotating mirror, for instance, when one wishes to direct the scanning beam 10 to another direction than along incident propagation path 11.

Figure 6A:
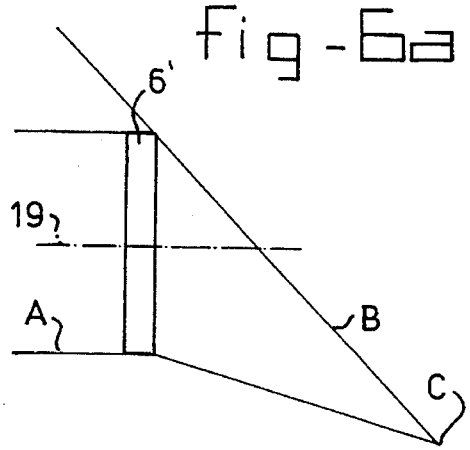
FIG. 6a diagrammatically shows recording of a holographic optical element.
Figure 6B:
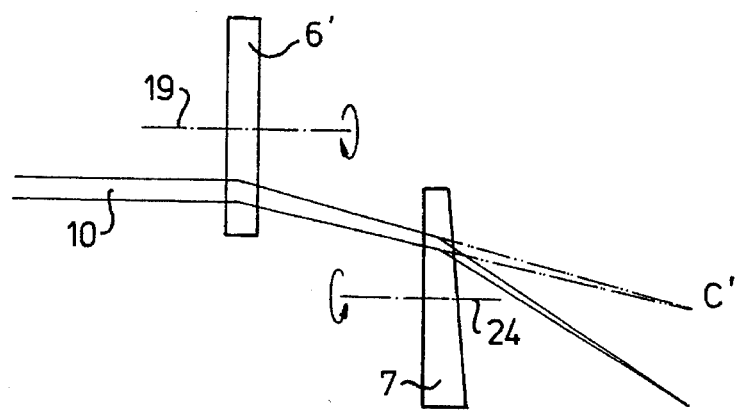
FIG. 6b shows a diagrammatic side view of a scanning device according to any of the FIGS. 1, 3, 4, in which the first deflection means are replaced by a holographic optical element.

When one wishes less aberration, introduced by optical wedges like prisms 6, 7, the first prism 6 may be replaced by a rotating holographic optical element 6' as diagrammatically shown in FIG. 6b. The desired hologram on the holographic optical element 6' may, as known by a person skilled in the art, be recorded by a collimated beam A and a converging reference beam B focused in point C, as is diagrammatically shown in FIG. 6a. During operation, a scanning beam 10 is used, which has, preferably, the same direction and wavelength as the recording beam A and which propagates substantially parallel to the axis of rotation 19 of the holographic optical element 6' (FIG. 6b). The scanning beam 10 impinges upon rotating holographic optical element 6' and will be deflected and focused by the hologram on holographic optical element 6'. The scanning beam 10 will be deflected without introducing aberration, which would result if beam A during recording would not be the same as beam 10 used during scanning actions. During operation, the scanning beam 10 will be focused to point C', which, because of the rotation of holographic element 6', will scan a circle. By introducing a rotating deflective prism 7 in the optical path behind holographic element 6', a desired scanning pattern may be generated. Even the second prism 7 may be replaced by a second holographic optical element (not shown).

I claim:

1. Scanning device for optically scanning symbol codes, comprising a laser source for producing a scanning beam, a first lens for focusing the scanning beam, a detector operatively associated with said scanning device for detecting light back-scattered by the scanned symbol codes, first and second rotatable deflection means for both transmitting and deflecting said scanning beam so as to generate a scanning pattern on the symbol code to be scanned, and drive means for independently rotating the first and second deflection means around a first and second axis of rotation, respectively, and means for directing said scanning beam to the first deflection means in such a way that said scanning beam, during operation, does not coincide with at least one of said axes of rotation.

2. Scanning device according to claim 1 wherein both deflection means are triangular prisms.

3. Scanning device according to claim 2 wherein the prisms have a prism angle of less than 15°.

4. Scanning device according to claim 3 wherein the prisms have mutually different prism angles.

5. Scanning device according to claim 1 wherein the first deflection means comprises a holographic optical element.

6. Scanning device according to claim 1, wherein during operation the scanning beam impinges upon said first deflection means substantially along the first axis of rotation which does not coincide with the second axis of rotation.

7. Scanning device according to claim 1 wherein during operation the scanning beam impinges upon said second deflection means substantially along the second axis of rotation which does not coincide with the first axis of rotation.

8. Scanning device according to claim 1 wherein the driving means comprises a first motor and a second motor, the first motor driving said first deflection means and the second motor driving said second deflection means, both said motors being connected to a synchronising/control unit, which controls the speed of rotation and the directions of rotation of both motors in order to generate said scanning pattern.

9. Scanning device according to claim 1, further comprising a reflective element for directing the light focused by the first lens to the deflection means.

10. Scanning device according to claim 1, further comprising a second lens for focusing the backscattered light onto the detector and wherein the second lens is provided with an aperture for transmitting the scanning beam focused by the first lens.

11. Scanning device according to claim 1, provided with a further lens for adjusting the size of the scanning pattern.

* * * * *